United States Patent
Djordjevic et al.

(10) Patent No.: US 10,222,552 B2
(45) Date of Patent: Mar. 5, 2019

(54) WAFER-SCALE FABRICATION OF VERTICAL OPTICAL COUPLERS

(71) Applicant: Oracle International Corporation, Redwood Shores, CA (US)

(72) Inventors: Stevan S. Djordjevic, San Diego, CA (US); Xuezhe Zheng, San Diego, CA (US); Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/993,340

(22) Filed: Jan. 12, 2016

(65) Prior Publication Data

US 2017/0199327 A1    Jul. 13, 2017

(51) Int. Cl.
G02B 6/122    (2006.01)
G02B 6/293    (2006.01)
G02B 6/12     (2006.01)

(52) U.S. Cl.
CPC ......... *G02B 6/29331* (2013.01); *G02B 6/122* (2013.01); *G02B 6/12002* (2013.01); *G02B 2006/12092* (2013.01); *G02B 2006/12104* (2013.01)

(58) Field of Classification Search
CPC ...... G02B 6/12; G02B 6/12004; G02B 6/122; G02B 6/1228; G02B 6/293; G02B 6/29331; G02B 6/4214; G02B 2006/12104
See application file for complete search history.

(56) References Cited

U.S. PATENT DOCUMENTS

| | | | | |
|---|---|---|---|---|
| 5,170,448 A * | 12/1992 | Ackley | ............. | G02B 6/12004 385/131 |
| 5,446,814 A * | 8/1995 | Kuo | ........................ | G02B 6/30 385/31 |
| 6,813,431 B2 * | 11/2004 | Davids | ................. | G02B 6/4214 257/436 |
| 6,993,225 B2 * | 1/2006 | Patel | ........................ | G02B 6/42 385/30 |
| 7,162,124 B1 * | 1/2007 | Gunn, III | ................. | G02B 6/30 385/27 |
| 8,447,152 B2 * | 5/2013 | Lee | ....................... | G02B 6/1228 385/39 |

(Continued)

*Primary Examiner* — Daniel Petkovsek
(74) *Attorney, Agent, or Firm* — Park, Vaughan, Fleming & Dowler LLP (57) ABSTRACT

An integrated circuit is described. This integrated circuit includes an optical waveguide defined in a semiconductor layer, and a dielectric optical waveguide disposed on the semiconductor layer and that overlaps a region of the optical waveguide. Moreover, the dielectric optical waveguide includes an optical device (such as a mirror) on a facet separating a first portion of the dielectric optical waveguide and a second portion of the dielectric optical waveguide. The facet may be at an angle relative to a plane of the dielectric optical waveguide and may include a metal layer. During operation, an optical signal conveyed by the optical waveguide is evanescent coupled to the dielectric optical waveguide. Then, the optical signal may be reflected by the optical device. For example, the angle of the facet may be 45°, so that the optical signal is reflected normal to the plane of the dielectric optical waveguide.

15 Claims, 5 Drawing Sheets

(56) References Cited

U.S. PATENT DOCUMENTS

| | | | |
|---|---|---|---|
| 8,787,712 B2* | 7/2014 | Grondin | B82Y 20/00 |
| | | | 385/14 |
| 9,164,231 B2* | 10/2015 | Shubin | G02B 6/4214 |
| 9,285,554 B2* | 3/2016 | Doany | G02B 6/4214 |
| 2006/0215982 A1* | 9/2006 | Umezawa | G02B 6/12002 |
| | | | 385/146 |

* cited by examiner

WAFER-SCALE FABRICATION OF VERTICAL OPTICAL COUPLERS

GOVERNMENT LICENSE RIGHTS

This invention was made with U.S. Government support under Agreement No. HR0011-08-9-0001 awarded by DARPA. The U.S. Government has certain rights in the invention.

BACKGROUND

Field

The present disclosure generally relates to techniques for vertical optical coupling of optical signals. More specifically, the present disclosure relates to an integrated circuit that includes a metalized facet to facilitate vertical optical coupling of the optical signal.

Related Art

Silicon photonics is a promising technology that can provide large communication bandwidth, low latency and low power consumption for inter-chip and intra-chip optical interconnects or links. A key component for use in inter-chip and intra-chip optical interconnects is optical couplers that can be integrated into integrated circuits that include other optical components.

One type of optical coupler provides vertical optical coupling of optical signals perpendicular to a plane of an integrated circuit. Such surface-normal optical couplers can facilitate optical communication between adjacent photonic chips.

However, fabricating surface-normal optical couplers is often difficult. For example, it can be difficult to fabricate a negative facet having an angle of 45°. In particular, such facets typically cannot be fabricated using existing reactive-ion etching techniques, and have only been demonstrated using complicated fabrication tool modifications.

Similarly, while diffraction gratings are often used as optical couplers, it is usually not possible to obtain vertical optical coupling using a diffraction grating. In addition, diffraction gratings typically have back-reflections, which can have a negative impact on some optical devices (such as hybrid optical sources, e.g., hybrid lasers).

Furthermore, while vertical optical coupling can be achieved using an inverse taper to expand the optical mode of an optical signal, this approach typically can only be used at the edge of the photonic chip.

Consequently, existing approaches for providing vertical optical coupling on integrated circuits are often complicated and expensive, and usually do not scale well.

Hence, what is needed is an optical coupler that does not suffer from the above-described problems.

SUMMARY

One embodiment of the present disclosure provides an integrated circuit that includes: a substrate; a buried-oxide layer disposed on the substrate; and a semiconductor layer disposed on the buried-oxide layer, where an optical waveguide is, at least in part, defined in the semiconductor layer, and the optical waveguide conveys an optical signal. Moreover, the integrated circuit includes: a dielectric optical waveguide disposed on the semiconductor layer and that overlaps a region of the optical waveguide. This dielectric optical waveguide is evanescent coupled to the optical waveguide, so the dielectric optical waveguide conveys the optical signal. Furthermore, the dielectric optical waveguide includes: a first portion of the dielectric optical waveguide; a second portion of the dielectric optical waveguide; and an optical device on a facet separating the first portion of the dielectric optical waveguide and the second portion of the dielectric optical waveguide. The facet has an angle relative to a plane of the dielectric optical waveguide, and a surface of the facet includes a metal layer. For example, the angle may be substantially 45°.

Note that the first portion of the dielectric optical waveguide and the second portion of the dielectric optical waveguide may include different materials.

Moreover, at least one of the first portion of the dielectric optical waveguide and the second portion of the dielectric optical waveguide may include: an amorphous material, a polycrystalline material, and/or a material other than a single crystal.

Furthermore, the optical device may include a mirror. This mirror may be: planar, concave, or convex. Note that a principle of operation of the mirror may be other than total internal reflection. Thus, there may not be a space or gap between the metal layer on the facet and the first portion of the dielectric optical waveguide or the second portion of the dielectric optical waveguide.

In some embodiments, the facet includes a staircase with multiple steps, and the optical device includes a staircase-approximation to a beam-shaping element.

Additionally, the region of the optical waveguide may include an inverse taper. Moreover, the first portion of the dielectric optical waveguide may have a different width than the optical waveguide in order to change a spot size of the optical signal.

Note that the substrate, the buried-oxide layer and the semiconductor layer may comprise a silicon-on-insulator technology.

Another embodiment provides a system that includes: a processor; a memory that stores a program module; and the integrated circuit. During operation, the program module is executed by the processor.

Another embodiment provides a method for reflecting an optical signal, which may be performed by the optical device in the integrated circuit.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Table 1 provides process parameters for use in a fabrication technique in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of an integrated circuit, a system that includes the integrated circuit, and a method for reflecting an optical signal in the integrated circuit are described. This integrated circuit includes an optical waveguide defined in a semiconductor layer, and a dielectric optical waveguide disposed on the semiconductor layer and that overlaps a region of the optical waveguide. Moreover, the dielectric optical waveguide includes an optical device (such as a mirror) on a facet separating a first portion of the dielectric optical waveguide and a second portion of the dielectric optical waveguide. The facet may be at an angle relative to a plane of the dielectric optical waveguide and may include a metal layer. During operation, an optical signal conveyed by the optical waveguide is evanescent coupled to the dielectric optical waveguide. Then, the optical signal may be reflected by the optical device. For example, the angle of the facet may be 45°, so that the optical signal is reflected normal to the plane of the dielectric optical waveguide.

By reflecting the light out of the plane of the dielectric optical waveguide using an integrated optical device, the fabrication technique used to fabricate the integrated circuit may solve the problem of integrating an optical device, such as a mirror, with on-chip optical waveguides and additional electrical components. In particular, the configuration in the integrated circuit provides a mirror with high reflectivity and low cost, and which can be scaled for use in wafer-scale fabrication of instances of the integrated circuit. Consequently, this fabrication technique may facilitate silicon photonic links for use in applications such as wavelength-division multiplexing.

Figure 1:
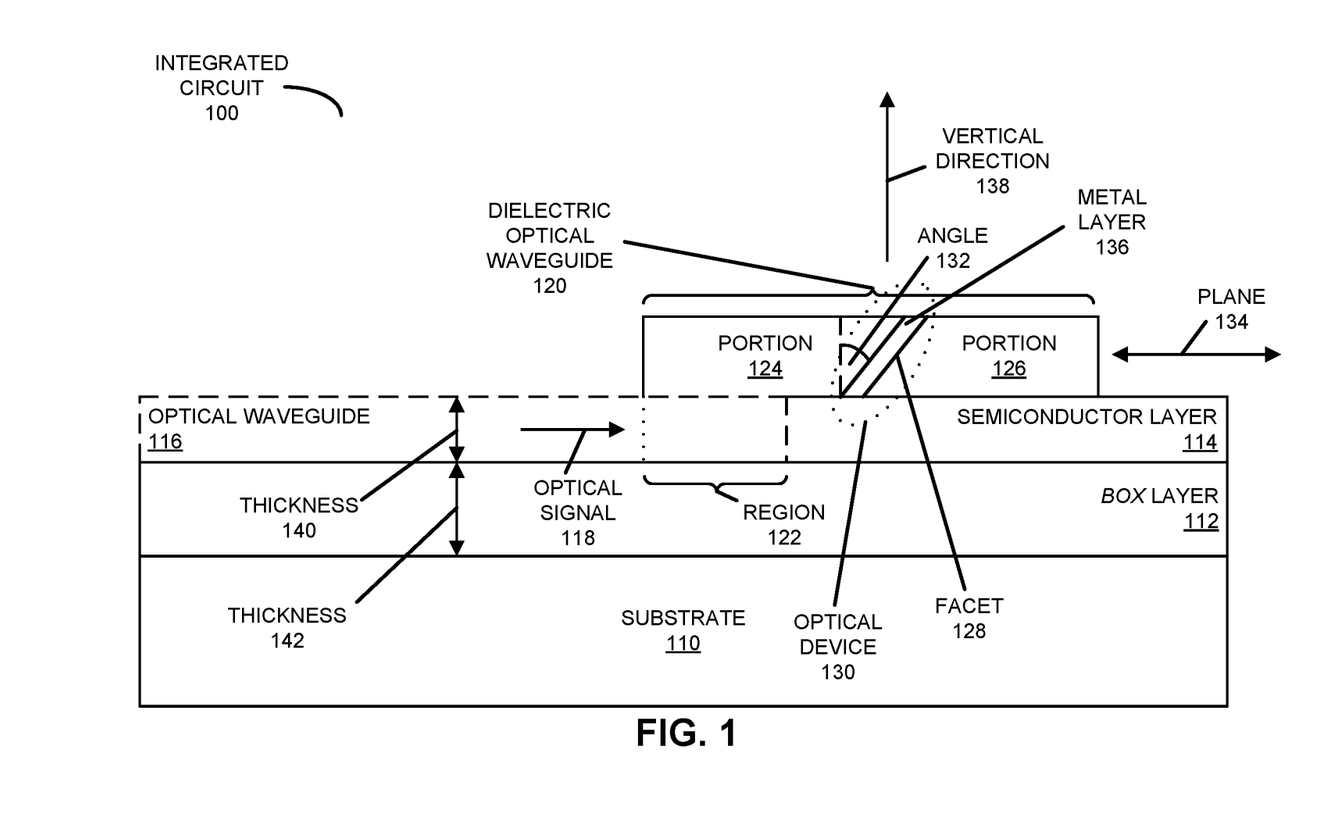
FIG. 1 is a block diagram illustrating a side view of an integrated circuit in accordance with an embodiment of the present disclosure.

We now describe embodiments of the integrated circuit. FIG. 1 presents a block diagram illustrating a side view of an integrated circuit 100. This integrated circuit includes: a substrate 110, a buried-oxide (BOX) layer 112 disposed on substrate 110, and a semiconductor layer 114 disposed on buried-oxide layer 112, where an optical waveguide 116 is, at least in part, defined in semiconductor layer 114, and optical waveguide 116 conveys an optical signal 118.

Moreover, integrated circuit 100 includes: a dielectric optical waveguide 120 disposed on semiconductor layer 114, which overlaps a region 122 of optical waveguide 116. This dielectric optical waveguide is evanescent coupled to optical waveguide 116, so dielectric optical waveguide 120 conveys optical signal 118 (i.e., light). However, at locations far removed or distal from region 122, optical signal 118 is highly confined because of the big difference between the index of refraction of semiconductor layer 114 and the surrounding material.

Furthermore, dielectric optical waveguide 120 includes a portion 124 and a portion 126. Additionally, dielectric optical waveguide 120 includes an optical device 130 on a facet 128 separating portions 124 and 126. This facet may have an angle 132 relative to a plane 134 of dielectric optical waveguide 120, and a surface of facet 128 may include a metal layer 136. For example, a magnitude of angle 132 may be substantially 45°, such as an angle within 5° of 45°. (Thus, facet 128 may be a so-called 'negative facet' having angle 132 of −45°.) While 45° is used as an illustration in the following discussion, in other embodiments a variety of values may be used for angle 132. In these embodiments, when a magnitude of angle 132 other than 45°, vertical optical coupling can be achieved using two or more mirrors.

Note that portions 124 and 126 of dielectric optical waveguide 120 may include different materials. Moreover, at least one of portions 124 and 126 may include: an amorphous material, a polycrystalline material, and/or a material other than a single crystal. For example, portions 124 and/or 126 may include: an oxide, silicon nitride, a polymer, amorphous silicon, etc. Consequently, as described further below, angle 132 may be fabricated using a dry etch (such as a plasma etch), because an anisotropic etch of semiconductor layer 114, such as a crystal-plane-selective anisotropic wet etch, may not be available for these non-crystalline materials.

Furthermore, optical device 130 may include a mirror. This mirror may be: planar, concave, or convex. This mirror may reflect incoming or incident light propagating in plane 134 of dielectric optical waveguide 120 out of plane 134 (i.e., along vertical direction 138 to other devices or components, such as an optical fiber or an external optical source). The mirror may reflect all of the incident light regardless of the light polarization and, thus, without back reflection along the propagation direction of optical signal 118 (which may be detrimental to optical sources, such as in a hybrid laser).

Note that a principle of operation of the mirror may be other than total internal reflection. Thus, there may not be a space or gap between metal layer 136 on facet 128 and portions 124 or 126. In some embodiments, facet 128 includes a staircase with multiple steps, and optical device 130 includes a staircase-approximation to a beam-shaping element.

Figure 2:
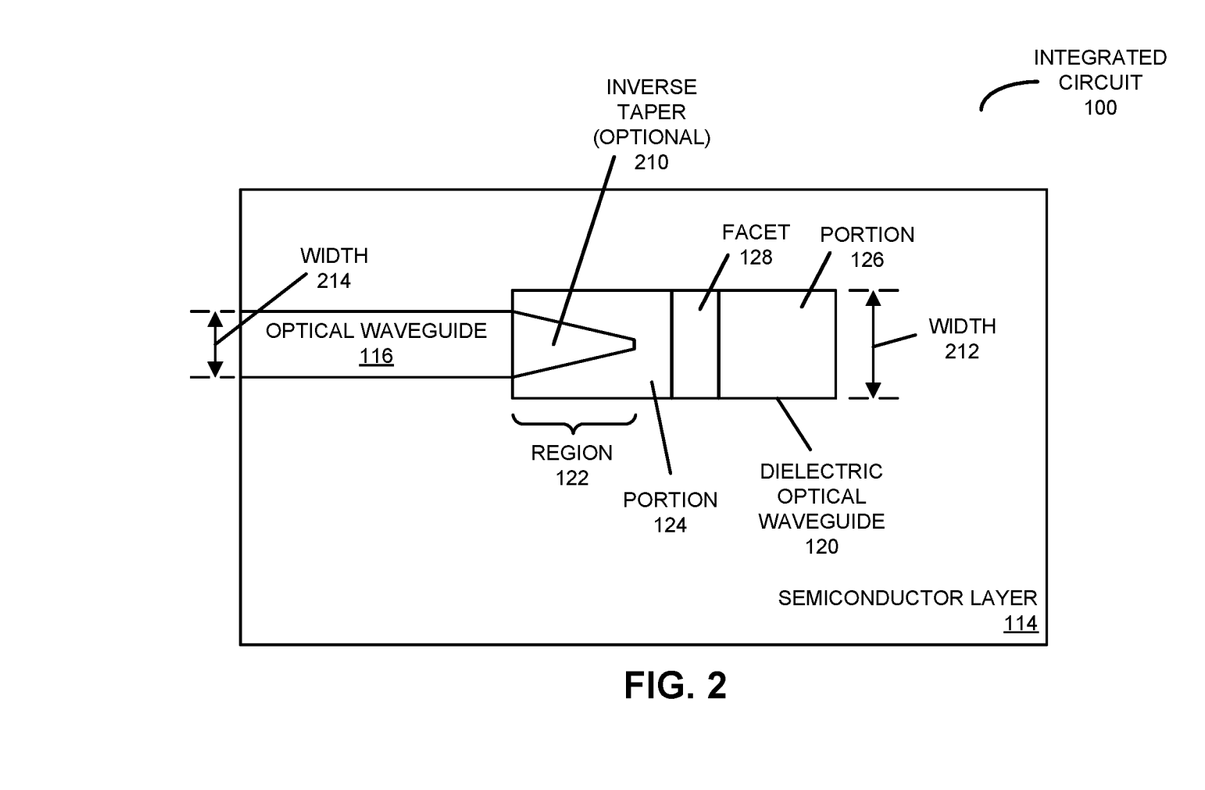
FIG. 2 is a block diagram illustrating a top view of the integrated circuit in FIG. 1 in accordance with an embodiment of the present disclosure.

FIG. 2 presents a block diagram illustrating a top view of integrated circuit 100. As shown in FIG. 2, region 122 of optical waveguide 116 may include an optional inverse taper 210. Moreover, portion 124 of dielectric optical waveguide 120 may have a different width 212 than a width 214 of optical waveguide 116 in order to change a spot size of optical signal 118. The combination of optional inverse taper 210 in semiconductor layer 114 and the spot-size converter in dielectric optical waveguide 120 may provide evanescent coupling or direct optical coupling between optical waveguide 116 and dielectric optical waveguide 120.

Referring back to FIG. 1, while a wide variety of materials can be used in semiconductor layer 114 in integrated circuit 100, in an exemplary embodiment silicon is used. Furthermore, while a wide variety of materials may be used in substrate 110, such as a semiconductor, glass or plastic, in an exemplary embodiment silicon is used in substrate 110, along with silicon dioxide in buried-oxide layer 112. Consequently, in some embodiments, substrate 110, buried-oxide layer 112 and semiconductor layer 114 may comprise a silicon-on-insulator (SOI) technology. (However, in other embodiments, the fabrication technique is applied to devices that use only dielectric optical waveguides, i.e. where the starting wafer is a blank silicon wafer with only the lower cladding layer deposited.)

In an exemplary embodiment, optical waveguide 116 conveys optical signal 118 having wavelengths between 1.1-1.7 μm, such as an optical signal having a fundamental wavelength of 1.3 or 1.55 μm. This optical waveguide may have a thickness 140 between 0.25 and 3 μm and width 214 (FIG. 2) between 0.5 and 3 μm. Note that because optical waveguide 116 may have a quasi-rectangular cross-section, it may be a quasi-single mode component. Moreover, buried-oxide layer 112 may have a thickness 142 between 0.3 and 3 μm.

We now describe embodiments of a method for fabricating integrated circuit 100 (FIGS. 1 and 2). In the discussion that follows, the fabrication technique is illustrated using a silicon dioxide ($SiO_2$), silicon oxynitride (SiON) and silicon nitride ($SiN_x$) photonic system. However, more generally, the fabrication technique may be applied to a system in which the core material in the dielectric optical waveguide is amorphous or polycrystalline, and can be deposited by a chemical or physical vapor deposition technique (plasma-enhanced chemical vapor deposition, low-pressure chemical vapor deposition, atomic layer deposition, sputtering, electron-beam evaporation, etc.). Moreover, the fabrication technique can be used with single-crystal core materials, such as SOI, when the two-step or component optical coupling shown in FIG. 2 is used.

Figure 3:
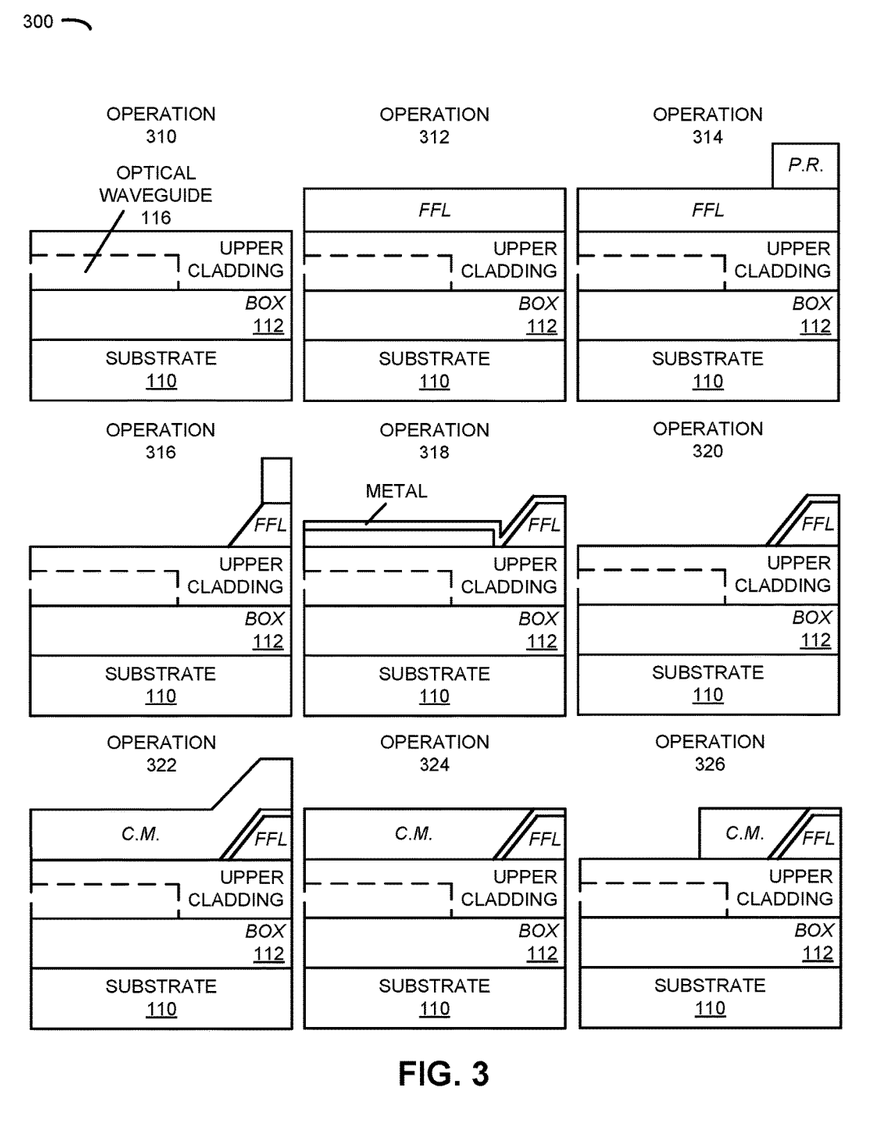
FIG. 3 is a drawing illustrating a method for fabricating the integrated circuit in FIG. 1 in accordance with an embodiment of the present disclosure.

FIG. 3 presents a block diagram illustrating a method 300 for fabricating integrated circuit 100 (FIGS. 1 and 2) on an SOI wafer with the silicon layer already patterned. For example, the SOI wafer may be obtained from a commercial foundry, with or without active devices and metal contacts already fabricated (such as optical modulator or an entire CMOS stack). In FIG. 3, the SOI wafer initially (operation 310) has a thin upper cladding (above buried-oxide layer 112, which provides the lower cladding) and a flat top surface. Note that the upper cladding may be thin enough to allow evanescent coupling to the dielectric optical waveguide, which will be formed later. In some embodiments, the upper cladding is omitted entirely, and direct optical coupling can be used between the silicon optical waveguide and the dielectric optical waveguide. Alternatively, in the case of an entire CMOS stack with thick dielectric layers, the upper cladding layer can be selectively etched off in desired areas.

Then, a facet-forming layer (FFL), with a height equivalent to or slightly higher than a desired core height may be deposited (operation 312) along with a photoresist mask. Typically, the FFL may be silicon oxide or silicon oxynitride, but a wide variety of materials can be considered. These materials can be deposited using techniques such as: plasma-enhanced chemical vapor deposition, electron-beam evaporation, etc. If there is a temperature limit imposed by devices previously fabricated on the SOI wafer (such as aluminum electrodes, contacts and implants), the FFL can be deposited using a low-temperature process, such as sputtering. Next, photoresist (P.R.) may be patterned (operation 314) in the locations where the negative 45° facets will be formed. Moreover, the FFL may be etched (operation 316) at the 45° angle. As described further below, this can be accomplished using an oxygenated fluorocarbon plasma condition in a reactive-ion etching chamber (i.e., dry etching).

After etching the 45° sidewalls in the FFL, the surface may be coated with a metal material, which functions as a mirror. In particular, the metal mirrors may be lithographically defined and deposited (operation 318), and the lithographic mask may be lifted off (operation 320). Note that the metal material may include: gold, silver, chrome, other metals, etc. Alternatively or additionally, a highly reflective (HR) dielectric multi-layer stack may be used.

Furthermore, the core material or C.M. (such as silicon oxynitride) may be deposited (operation 322) on the wafer, covering the sides and the top of the FFL. In order to even the dielectric optical waveguide core level, chemical-mechanical polishing may be performed (operation 324). Additionally, the dielectric optical waveguides may be defined (operation 326).

We now further describe the angled dry-etching process. Depending on the fluorine-to-carbon (F/C) ratio and the process pressure, fluorocarbon gases (such as $CF_4$, $CHF_3$, $CH_3F$, $C_4F_8$), which are used in reactive-ion etching of dielectric materials (such as silicon dioxide, silicon oxynitride, etc.), have the potential for polymer deposition during the etching process. These deposited polymers can passivate the etched sidewalls and may protect them from erosion during the continued etch process.

Note that adding hydrogen during the etching reduces the F/C ratio, because the hydrogen grabs fluorine ions from the plasma to form hydrogen-fluoride vapor. Alternatively, adding oxygen during the etching increases the F/C ratio, because the oxygen interacts with carbon ions to form carbon-oxygen species.

Moreover, an oxygen plasma usually attacks and removes some of the deposited polymers, as well as attacking the starting photoresist mask. Photoresist mask erosion and polymer deposition during the etch process are two of the key process parameters that determine the angle of the etched sidewalls. In particular, increasing the oxygen content during the etching typically increases the erosion rate of the photoresist mask, i.e., the lateral ashing rate. The resulting sidewall angle α can be estimated as $$\alpha = \arctan\left(\frac{VER}{LER}\right),$$

where VER is the vertical etch rate of the FFL and LAR is the lateral ashing rate of the photoresist mask.

In general, varying the oxygen content during the etching produces a significant difference in the sidewall angle. As shown in Table 1, which presents process parameters for use in the fabrication technique, recipe B produces sidewall angles smaller than 45°. Therefore, by using this recipe, a target angle of 45° can be achieved. Note that other process parameters that influence the sidewall angle are, primarily, the starting angle of the photoresist mask, the process pressure, and the field bias during the etching. By optimizing these process parameters, sidewall angles with the desired 45° value can be reliably produced.

TABLE 1

| Recipe | $CF_4$ [sccm] | $CHF_3$ [sccm] | Ar [sccm] | $O_2$ [sccm] | Pressure [mTorr] | RF power [W] | Etch rate [nm/min] |
|---|---|---|---|---|---|---|---|
| A | 20 | 15 | 70 | 2 | 50 | 250 | 60 |
| B | 20 | 15 | 70 | 5 | 50 | 250 | 45 |

As noted previously, the resulting facets may have flat sidewall surfaces or curved sidewall surfaces. The latter may be used to implement lens effects, which can be used to improve mode-matching during the vertical optical coupling. In some embodiments, operations 314 and 316 in FIG. 3 are replaced by a gray-tone lithography process and a plasma-etching process with proper selectivity between photoresist and the FFL.

Dielectric optical waveguides fabricated using silicon oxynitride (as opposed to silicon optical waveguides) may provide several advantages, including a reduced thermo-optic coefficient (by approximately an order of magnitude) and the possibility or polarization-insensitive optical devices (e.g., by using non-birefringent dielectric optical waveguides that yield degenerate solutions for the transverse-electric and the transverse-magnetic modes). For example, in some embodiments a 220 nm SOI platform may be coupled to a 3 µm thick silicon oxynitride core deposited using plasma-enhanced chemical vapor deposition. In addition, active devices, such as ring modulators, may be fabricated in silicon, whereas temperature-sensitive optical devices, such as arrayed waveguide gratings may be fabricated in silicon oxynitride and, thus, may benefit from polarization insensitivity. (In particular, if 3 µm wide and 3 µm thick, fully etched waveguides in silicon oxynitride are used, the transverse-electric and the transverse-magnetic modes have equal effective index of refraction and group velocity.) However, other dielectric optical waveguide thicknesses can be used for different applications.

The proposed fabrication technique may allow low-loss vertical (90°) optical coupling, which is typically difficult to achieve with grating couplers. Moreover, the proposed fabrication technique may provide the advantages of edge coupling (such as large modes that result in misalignment tolerance, the ability to eliminate back-reflections by anti-reflective coating, etc.), but may also provide much better scalability because of an increased density of integration. In particular, while edge coupling can only be used on the edges of the die, the vertical optical coupling provided in the integrated circuit can be used anywhere on the die. Thus, the number of optical couplers may only be limited by the area, and the routing of the optical waveguides may be much simpler, thereby reducing the complexity and the cost of the integrated circuit.

Figure 4:
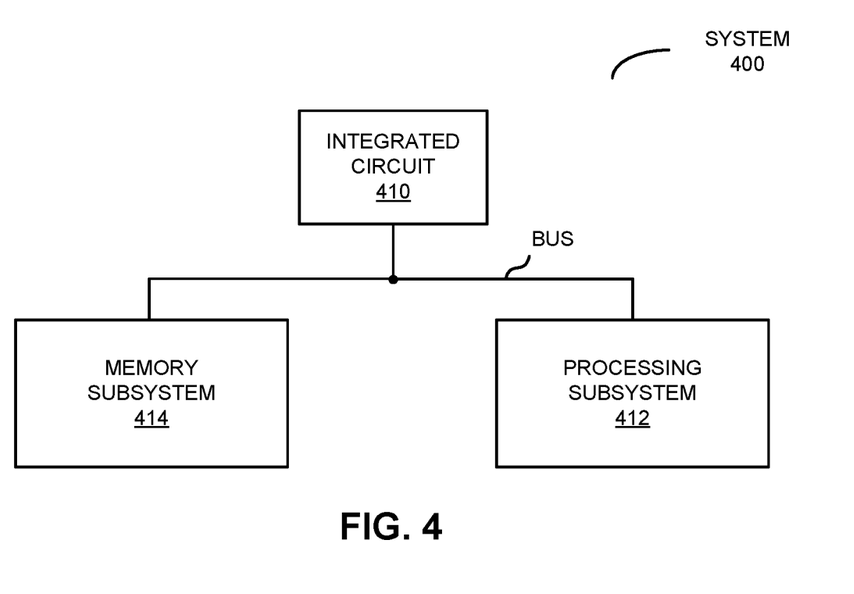
FIG. 4 is a block diagram illustrating a system that includes the integrated circuit of FIG. 1 in accordance with an embodiment of the present disclosure.

Integrated circuit 100 (FIG. 1) may be used in a variety of applications. This is shown in FIG. 4, which presents a block diagram illustrating a system 400 that includes an integrated circuit 410, such as one of the preceding embodiments of the integrated circuit. In some embodiments, system 400 includes processing subsystem 412 (with one or more processors) and memory subsystem 414 (with memory).

In general, functions of integrated circuit 410 and system 400 may be implemented in hardware and/or in software. Thus, system 400 may include one or more program modules or sets of instructions stored in a memory subsystem 414 (such as DRAM or another type of volatile or non-volatile computer-readable memory), which, during operation, may be executed by a processing subsystem 412. Note that the one or more computer programs may constitute a computer-program mechanism. Furthermore, instructions in the various modules in memory subsystem 414 may be implemented in: a high-level procedural language, an object-oriented programming language, and/or in an assembly or machine language. Note that the programming language may be compiled or interpreted, e.g., configurable or configured, to be executed by the processing subsystem.

Components in system 400 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 400 may be at one location or may be distributed over multiple, geographically dispersed locations.

System 400 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Moreover, integrated circuit 410 can be used in a wide variety of applications, such as: communications (for example, in a transceiver, an optical interconnect or an optical link, such as for intra-chip or inter-chip communication), a radio-frequency filter, a bio-sensor, data storage (such as an optical-storage device or system), medicine (such as a diagnostic technique or surgery), a barcode scanner, metrology (such as precision measurements of distance), manufacturing (cutting or welding), a lithographic process, data storage (such as an optical-storage device or system) and/or entertainment (a laser light show).

Furthermore, the embodiments of integrated circuit 410 and/or system 400 may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the optical source, integrated circuit 410 and/or system 400 may be implemented more in hardware and less in software, or less in hardware and more in software, as is known in the art.

While the preceding embodiments have been illustrated with particular elements and compounds, a wide variety of materials and compositions (including stoichiometric and non-stoichiometric compositions) may be used, as is known to one of skill in the art. Thus, while a silicon optical waveguide was illustrated in the preceding embodiments, the fabrication technique may be used with other materials (such as germanium and/or silicon germanium), as is known to one of skill in the art. Moreover, the semiconductor layer may include polysilicon or amorphous silicon. Furthermore, the materials and compounds in integrated circuit 410 may be fabricated using a wide variety of processing techniques, including: evaporation, sputtering, chemical vapor deposition, molecular-beam epitaxy, wet or dry etching (such as photolithography or direct-write lithography), polishing, etc. In addition, a wide variety of optical components may be used in or in conjunction with the optical device and/or integrated circuit 410. Furthermore, a wide variety of optical sources may be integrated with or included in integrated circuit 410, including many different types of lasers or non-laser optical sources (such as a light-emitting diode).

Figure 5:
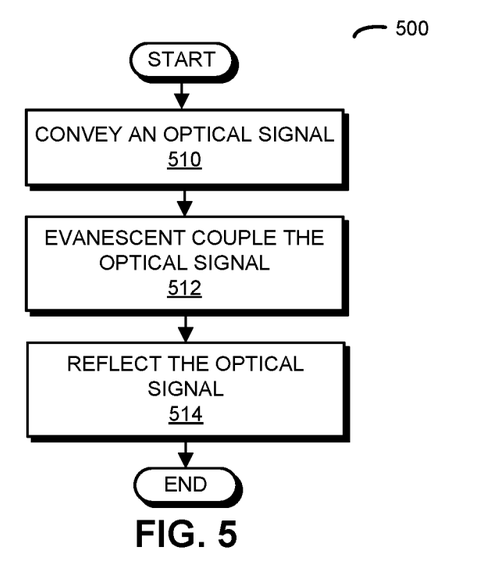
FIG. 5 is a flow diagram illustrating a method for reflecting an optical signal in accordance with an embodiment of the present disclosure.

We now describe embodiments of a method for reflecting an optical signal. FIG. 5 presents a flow chart illustrating a method 500 for reflecting an optical signal in an integrated circuit, such as integrated circuit 100 (FIGS. 1 and 2). During the method, an optical waveguide disposed in a semiconductor layer in the integrated circuit conveys the optical signal (operation 510) in a plane of the optical waveguide. Then, the optical signal is evanescent coupled (operation 512) to a dielectric optical waveguide disposed on the semiconductor layer and that overlaps a portion of the optical waveguide. Moreover, a mirror, defined on a facet separating a first portion of the dielectric optical waveguide and a second portion of the dielectric optical waveguide, reflects the optical signal (operation 514). Note that the facet may have an angle relative to a plane of the dielectric optical waveguide, and a surface of the facet may include a metal layer.

In some embodiments of methods 300 (FIG. 3) and/or 500, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
   a substrate;
   a buried-oxide layer disposed on the substrate;
   a semiconductor layer disposed on the buried-oxide layer, wherein an optical waveguide is, at least in part, defined in the semiconductor layer, and
   wherein, during operation, the optical waveguide conveys an optical signal; and
   a dielectric optical waveguide, disposed on the semiconductor layer and that overlaps a region of the optical waveguide, that, during operation, is evanescently coupled to the optical waveguide, so the dielectric optical waveguide conveys the optical signal, wherein the dielectric optical waveguide includes:
      a first portion of the dielectric optical waveguide comprised of one of an oxide, a silicon nitride, a polymer, and an amorphous silicon;
      a second portion of the dielectric optical waveguide comprised of one of an oxide, a silicon nitride, a polymer, and an amorphous silicon; and
      an optical device on a facet separating the first portion of the dielectric optical waveguide and the second portion of the dielectric optical waveguide, wherein the facet has an angle relative to a plane of the dielectric optical waveguide, wherein the facet is formed by etching the second portion of the dielectric optical waveguide, wherein the plane is parallel to a surface of the optical waveguide that is in contact with the dielectric optical waveguide, and
      wherein a surface of the facet includes a metal layer which functions as a mirror, wherein the metal layer is deposited onto the etched second portion of the dielectric optical waveguide.

2. The integrated circuit of claim 1, wherein the first portion of the dielectric optical waveguide and the second portion of the dielectric optical waveguide include different materials.

3. The integrated circuit of claim 1, wherein the angle is within 5° of 45°.

4. The integrated circuit of claim 1, wherein the mirror is one of: planar, concave, and convex.

5. The integrated circuit of claim 1, wherein there is no gap between the metal layer and the first portion or the second portion to avoid total internal reflection.

6. The integrated circuit of claim 1, wherein the facet includes a staircase with multiple steps; and
   wherein the optical device includes a staircase-approximation to a beam-shaping element.

7. The integrated circuit of claim 1, wherein the region of the optical waveguide includes an inverse taper.

8. The integrated circuit of claim 1, wherein the first portion of the dielectric optical waveguide has a different width than the optical waveguide in order to change a spot size of the optical signal.

9. The integrated circuit of claim 1, wherein the substrate, the buried-oxide layer and the semiconductor layer comprise a silicon-on-insulator technology.

10. A system, comprising:
    a processor;
    a memory coupled to the processor; and
    an integrated circuit, wherein the integrated circuit comprises:
    a substrate;
    a buried-oxide layer disposed on the substrate;
    a semiconductor layer disposed on the buried-oxide layer, wherein an optical waveguide is, at least in part, defined in the semiconductor layer, and
    wherein, during operation, the optical waveguide conveys an optical signal; and
    a dielectric optical waveguide, disposed on the semiconductor layer and that overlaps a region of the optical waveguide, that, during operation, is evanescently coupled to the optical waveguide, so the dielectric optical waveguide conveys the optical signal, wherein the dielectric optical waveguide includes:

a first portion of the dielectric optical waveguide comprised of one of an oxide, a silicon nitride, a polymer, and an amorphous silicon;

a second portion of the dielectric optical waveguide comprised of one of an oxide, a silicon nitride, a polymer, and an amorphous silicon; and an optical device on a facet separating the first portion of the dielectric optical waveguide and the second portion of the dielectric optical waveguide, wherein the facet has an angle relative to a plane of the dielectric optical waveguide, wherein the facet is formed by etching the second portion of the dielectric optical waveguide, wherein the plane is parallel to a surface of the optical waveguide that is in contact with the dielectric optical waveguide, and wherein a surface of the facet includes a metal layer which functions as a mirror, wherein the metal layer is deposited onto the etched second portion of the dielectric optical waveguide.

11. The system of claim 10, wherein the first portion of the dielectric optical waveguide and the second portion of the dielectric optical waveguide include different materials.

12. The system of claim 10, wherein the angle is within 5° of 45°.

13. The system of claim 10, wherein the mirror is one of: planar, concave, and convex.

14. The system of claim 10, wherein the facet includes a staircase with multiple steps; and
wherein the optical device includes a staircase-approximation to a beam-shaping element.

15. The system of claim 10, wherein the region of the optical waveguide includes an inverse taper.

* * * * *

UNITED STATES PATENT AND TRADEMARK OFFICE
CERTIFICATE OF CORRECTION

PATENT NO. : 10,222,552 B2
APPLICATION NO. : 14/993340
DATED : March 5, 2019
INVENTOR(S) : Djordjevic et al.

It is certified that error appears in the above-identified patent and that said Letters Patent is hereby corrected as shown below:

In the Specification

In Column 5, Line 1, after "3 µm" insert -- , --.

Signed and Sealed this
Twenty-fifth Day of February, 2020

Andrei Iancu
*Director of the United States Patent and Trademark Office*